United States Patent
Huang

(10) Patent No.: US 6,417,609 B1
(45) Date of Patent: Jul. 9, 2002

(54) LOCKING STRUCTURE FOR PICTURE TUBE AND FRONT FRAME BODY

(76) Inventor: Kuo-Cheng Huang, No. 28, Lane 428, Chung-Cheng North Road, San-Chung City, Taipei Hsien (TW)

( * ) Notice: Subject to any disclaimer, the term of this patent is extended or adjusted under 35 U.S.C. 154(b) by 183 days.

(21) Appl. No.: 09/655,805

(22) Filed: Sep. 5, 2000

(51) Int. Cl.$^7$ ................................................ H01J 29/80
(52) U.S. Cl. ........................ 313/407; 313/402; 313/406
(58) Field of Search ................................. 313/201, 371, 313/402, 406, 407, 292, 22

Primary Examiner—Vip Patel
(74) Attorney, Agent, or Firm—Rosenberg, Klein & Lee

(57) ABSTRACT

Locking structure for picture tube and front frame body. Multiple fixing posts are formed on inner side of the front frame body and multiple fixing plates project from outer periphery of the picture tube corresponding to the fixing posts which retain the fixing plates. The front frame body is formed with a central window. When the bottom faces of the respective fixing plates of the picture tube are correspondingly planely rested on the fixing posts of the front frame body, the end edge of the flange of the window of the front frame body is snugly sealedly attached to the periphery of the picture tube. When screws are respectively screwed to forcedly lock the fixing plates of the picture tube on the corresponding fixing posts of the front frame body, the fixing plates are slightly downward inlaid into the top ends of the fixing posts so as to prevent the picture tube from being displaced or slided.

1 Claim, 3 Drawing Sheets

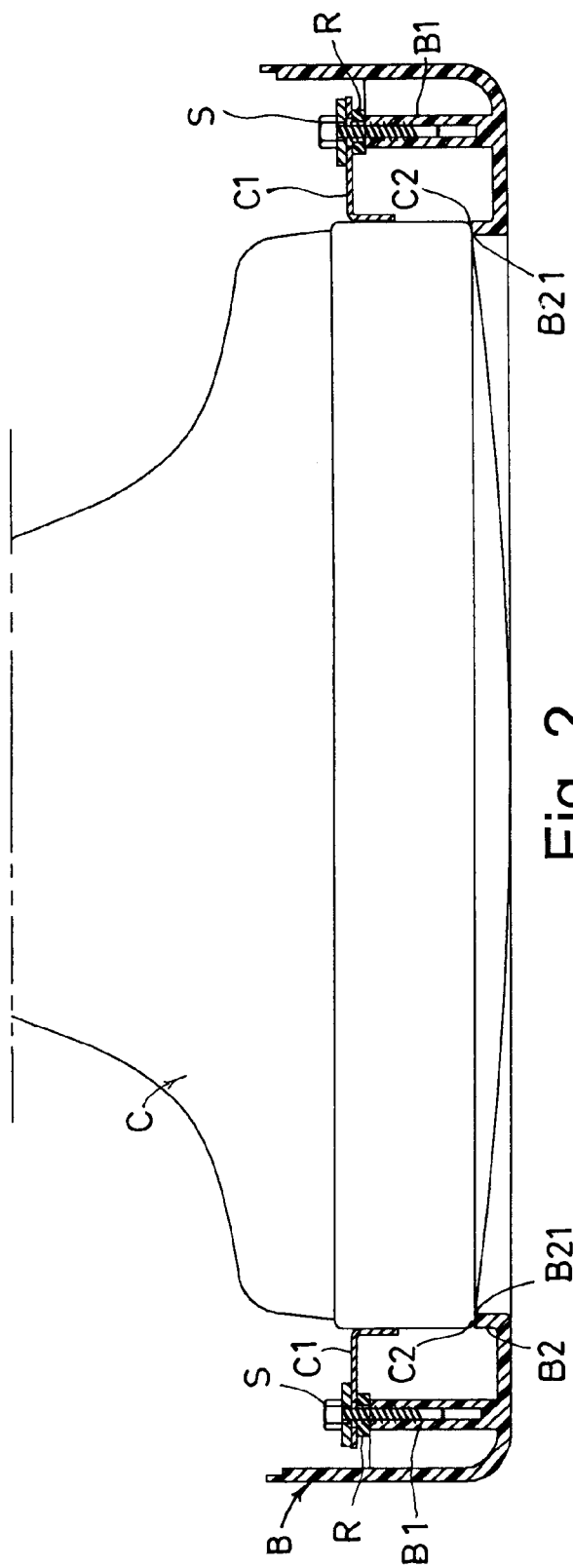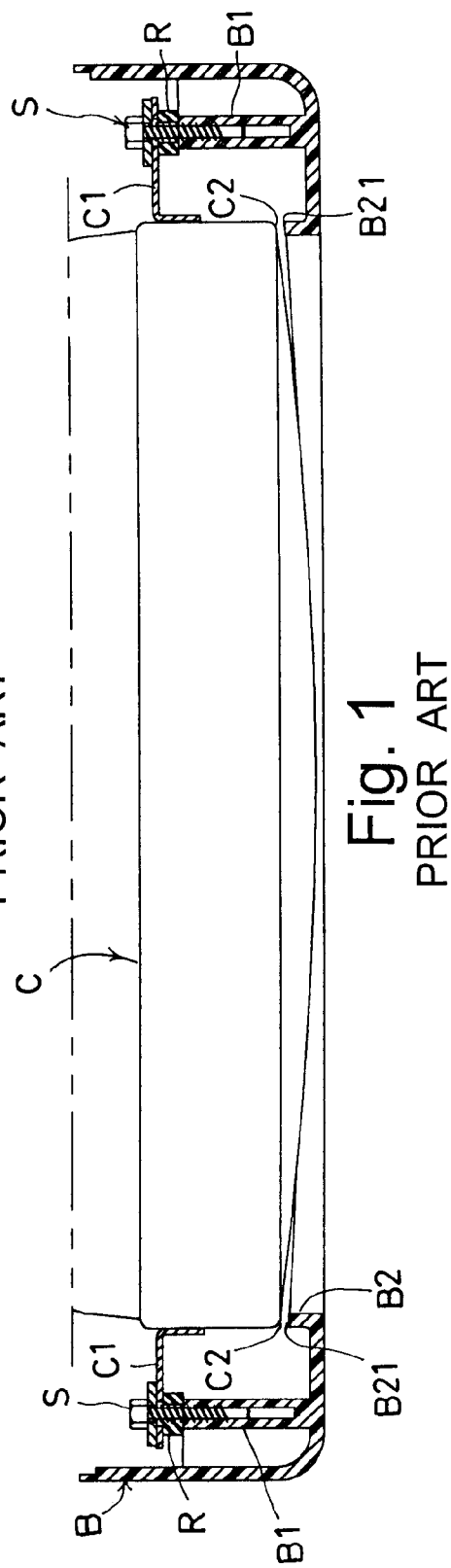

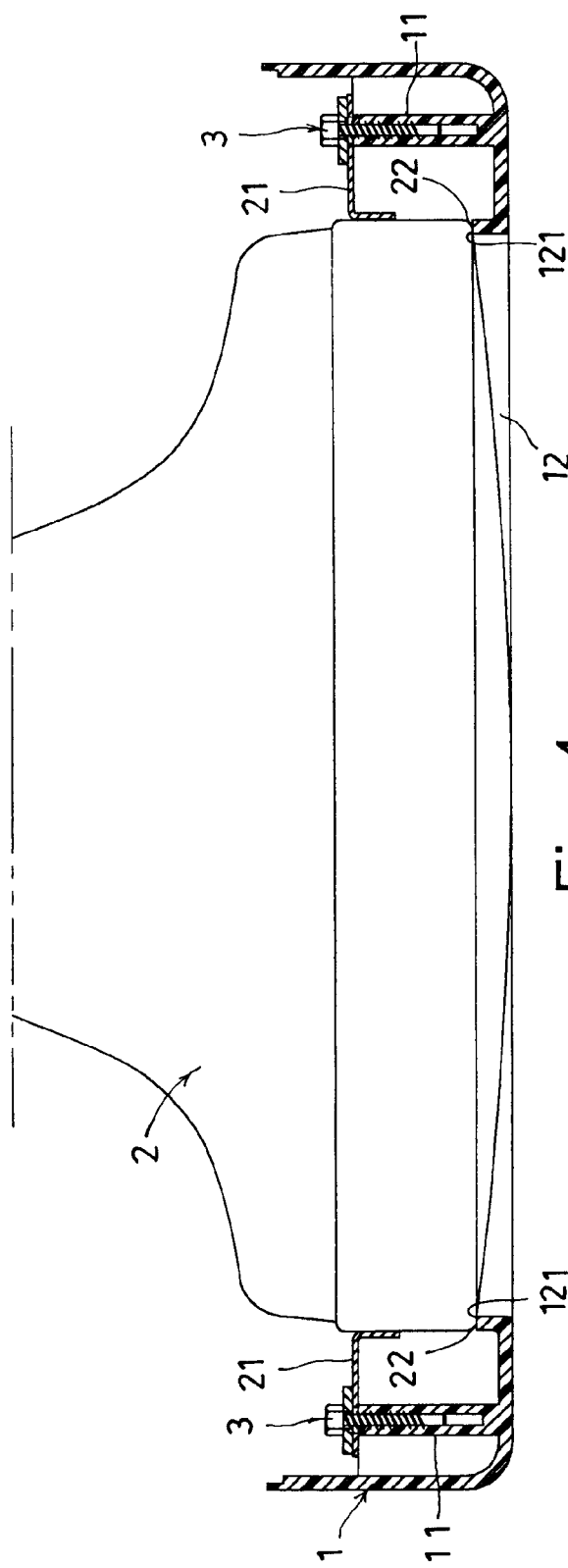
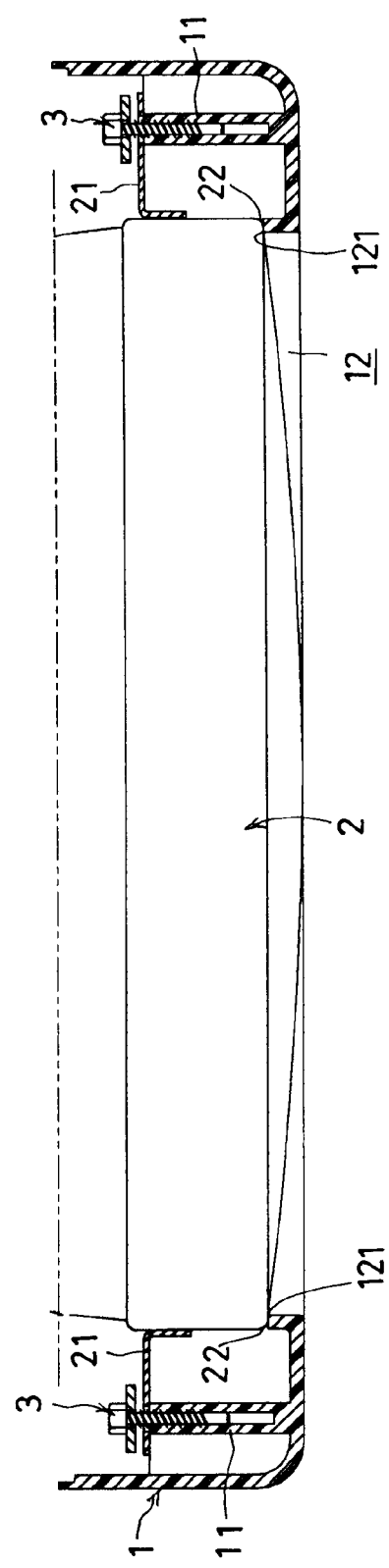

LOCKING STRUCTURE FOR PICTURE TUBE AND FRONT FRAME BODY

BACKGROUND OF THE INVENTION

The present invention relates to a locking structure for picture tube and front frame body. When the bottom faces of the respective fixing plates projecting from outer periphery of the picture tube are planely rested on the fixing posts of the front frame body, the end edge of the flange of the window of the front frame body is snugly sealedly attached to the periphery of the picture tube.

FIGS. 1 and 2 show a conventional locking structure for a picture tube C and a front frame body B of an existent monitor. Multiple fixing posts B1 are formed on inner side of the front frame body B. A flange B2 inward projects from the periphery of. the window of the front frame body B. The end edge B21 of the flange B2 is formed with a curvature as that of the periphery of the picture tube C. Several fixing plates Cl project from outer periphery of the picture tube C. When installed, a soft rubber washer R is positioned between the bottom end of each fixing plate Cl and each fixing post B1. Then a screw S is screwed into the fixing post B1 to lock the fixing plate C1 thereon. As shown in FIG. 1, when the fixing plate C1 of the picture tube C is rested over the rubber washer R on the corresponding fixing post B1, the end edge B21 of the flange B2 of the periphery of window of the front frame body B is spaced from the periphery C2 of the picture tube C by a small gap. Then a pneumatic screwdriver is used to fasten the respective screws S to tightly compress the rubber washers R and upward pull the front frame body B so as to make the end edge B21 of the flange B2 sealedly attach to the periphery of the picture tube C (as shown in FIG. 2). Such assembling and locking structure has some shortcomings as follows:

1. The rubber washer R must be fireproof and meet UL specification so that it is expensive.
2. Only after tightly compressing the rubber washers R, the end edge B21 of the flange B2 of the periphery of the window of the front frame body B can sealedly attach to the periphery of the picture tube C.
3. The rubber washer R is quite soft so that when using a pneumatic screwdriver to fasten the respective screws S with greater driving torque, the respective screws may be over-tightened to over-compress the rubber washers R. This often leads to breakage of the fixing posts B1. Also, the screws S may be tightened to ununified extents. This may deform the front frame body B and pull and whiten the front frame body B.
4. The rubber washers R are soft and the picture tube is quite heavy. After locked, in the dropping test, displacement often takes place. This leads to increased ratio of defective products.

SUMMARY OF THE INVENTION

It is therefore a primary object of the present invention to provide a locking structure for picture tube and front frame body. Multiple fixing posts are formed on inner side of the front frame body and multiple fixing plates project from outer periphery of the picture tube corresponding to the fixing posts which retain the fixing plates. The front frame body is formed with a central window. When the bottom faces of the respective fixing plates of the picture tube are correspondingly planely rested on the fixing posts of the front frame body, the end edge of the flange of the window of the front frame body is snugly sealedly attached to the periphery of the picture tube. When screws are respectively screwed to forcedly lock the fixing plates of the picture tube on the corresponding fixing posts of the front frame body, the fixing plates are slightly downward inlaid into the top ends of the fixing posts so as to prevent the picture tube from being displaced or slided.

The present invention can be best understood through the following description and accompanying drawings wherein:

BRIEF DESCRIPTION OF THE DRAWINGS

FIG. 1 is a sectional view showing that a conventional picture tube is not yet completely assembled with the front frame body;

FIG. 2 is a sectional view showing that the conventional picture tube is completely assembled with the front frame body;

FIG. 3 is a sectional view showing that the picture tube and the front frame body of the present invention are not yet completely locked;

FIG. 4 is a sectional view showing that the picture tube and the front frame body of the present invention are completely locked;

DETAILED DESCRIPTION OF THE PREFERRED EMBODIMENT

Figure 5:
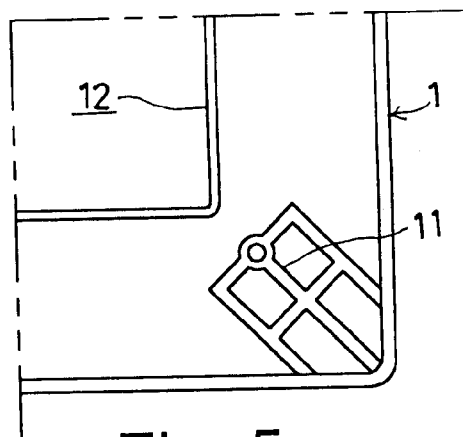
FIG. 5 is a top view of a corner of the present invention, showing that the picture tube is not yet locked.
Figure 6:
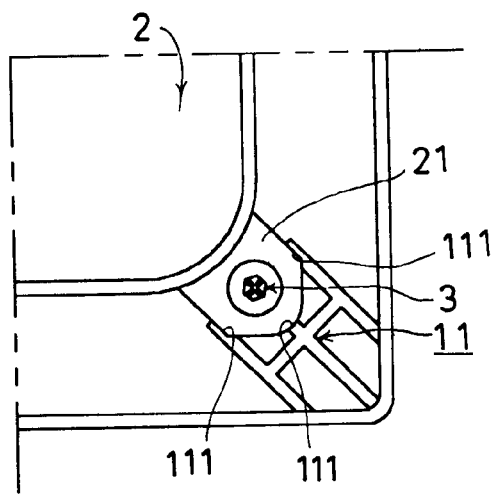
FIG. 6 is a top view according to FIG. 5, showing that the picture tube is locked.
Figure 7:
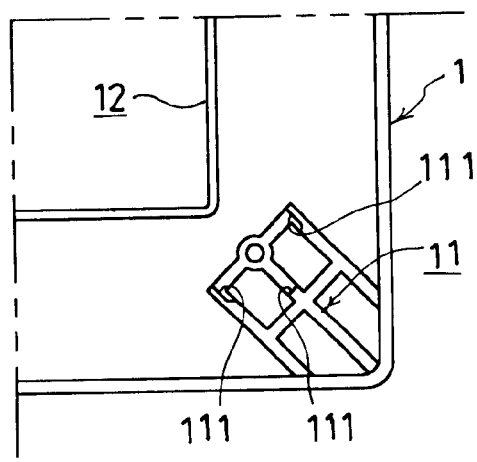
FIG. 7 is a top view according to FIG. 6, showing that after the picture tube is removed, the fixing post of the front frame body is formed with an embossed section.

FIGS. 3 to 7 show the locking structure for picture tube and front frame body according to the present invention. Multiple fixing posts 11 are formed on inner side of the front frame body 1. Multiple fixing plates 21 project from outer periphery of the picture tube 2 corresponding to the fixing posts 11. The fixing posts 11 serve to respectively retain the fixing plates 21. The front frame body 1 is formed with a central window 12. A flange is formed along the periphery of the window 12. When the bottom faces of the respective fixing plates 21 of the picture tube 2 are planely rested on the fixing posts 11 of the front frame body 1, the end edge of the flange of the window of the front frame body is snugly sealedly attached to the periphery of the picture tube. When screws are respectively screwed to forcedly lock the fixing plates 21 of the picture tube on the corresponding fixing posts of the front frame body, the fixing plates 21 are slightly downward inlaid into the top ends of the fixing posts 11. Therefore, once the fixing plates 21 is forcedly tightened, the originally plane top faces of the fixing posts 11 (as shown in FIG. 5) will be formed with an embossed section 111 (as shown in FIG. 7). Therefore, the periphery of the fixing plate 21 is surrounded by the embossed section 111 (as shown in FIG. 6) to prevent the picture tube from being displaced or over-tightened.

When assembled, it is unnecessary to additionally dispose any rubber wash between the fixing plate 21 of the picture tube 2 and the corresponding fixing post 11 of the front frame body 1. The bottom face of the fixing plate 21 of the picture tube 2 can be directly planely rested on the fixing post 11. Under such circumstance, the end edge 121 of the flange of the window of the front frame body 1 can be snugly sealedly attached to the periphery 22 of the picture tube 2. It is no more necessary as prior art to tighten the respective screws S for compressing the rubber washers R so as to make the the end edge B21 of the flange of the window of the front frame body B can be snugly sealedly attached to the periphery 22 of the picture tube C. Therefore, the cost for the rubber washers is saved and the assembling procedure is simplified. Moreover, once the picture tube 2 and the front frame body 1 are locked, the bottom face of the fixing plate 21 is slightly downward inlaid into the fixing post 11 so as to avoid displacement.

According to the above arrangement, the present invention has the following advantages:

1. The expensive fireproof rubber washers which meet UL specification are omitted so that the manufacturing cost is lowered.
2. The number of the components is reduced so that the assembling procedure is facilitated.
3. The problems of displacement and over-tightening caused by the rubber washers of the conventional locking structure are eliminated so that the ratio of good products is increased and the cost is lowered.
4. The problem of over-tightening is eliminated so that the front frame body is prevented from being deformed and pulled and whitened and the quality of the products can be enhanced.

The above embodiment is only used to illustrate the present invention, not intended to limit the scope thereof. Many modifications of the above embodiment can be made without departing from the spirit of the present invention.

What is claimed is:

1. Locking structure for picture tube and front frame body, multiple fixing posts being formed on inner side of the front frame body and multiple fixing plates projecting from outer periphery of the picture tube corresponding to the fixing posts, the fixing posts serving to respectively retain the fixing plates, the front frame body being formed with a central window, said locking structure being characterized in that when the bottom faces of the respective fixing plates of the picture tube are correspondingly planely rested on the fixing posts of the front frame body, the end edge of the flange of the window of the front frame body is snugly sealedly attached to the periphery of the picture tube and when screws are respectively screwed to forcedly lock the fixing plates of the picture tube on the corresponding fixing posts of the front frame body, the fixing plates are slightly downward inlaid into the top ends of the fixing posts.

* * * * *